United States Patent Office 3,367,901
Patented Feb. 6, 1968

3,367,901
COATING COMPOSITION
John C. Mutchler, Wilmington, Del., assignor to E. I. du Pont de Nemours and Company, Wilmington, Del., a corporation of Delaware
No Drawing. Filed June 9, 1964, Ser. No. 373,819
16 Claims. (Cl. 260—33.6)

ABSTRACT OF THE DISCLOSURE

New compositions capable of forming taste-free topcoats on polymer base coats which comprise an organic solvent with a boiling range of up to about 220° C. having dissolved therein (A) a copolymer consisting essentially of 60% to 90% by weight of 1,3-butadiene units of which at least about 60% by weight are linked by 1,2 addition and about 10% to about 40% by weight of units of alpha-methylstyrene or styrene, the intrinsic viscosity of the copolymer being from 0.05 to 1.0 and (B) a drying agent consisting essentially of a cerium dryer and a manganese dryer in amounts sufficient to provide 50 to 3000 parts of cerium and 50 to 3000 parts manganese per million parts of (A) copolymer.

---

This invention concerns compositions for forming films and more particularly fast-drying organic polymer compositions for forming taste-free top coatings for metal beverage container interiors.

The composition used in the past to produce top coats for the interior surfaces of metal containers for beer, ale, soft drinks, etc., have usually contained copolymers of vinyl or vinylidene monomers in a ketone solvent. More recently, solutions containing copolymers of butadiene-alpha-methyl-styrene have been proposed for producing such coatings. These butadiene-alpha-methyl-styrene solutions have had relatively slow curing rates which rendered them undesirable for mass production methods and the resulting films usually imparted a characteristic off-taste to the beverage.

It has now been discovered that a composition which comprises an organic solvent with a boiling range up to about 220° C. having dissolved therein (A) a copolymer consisting essentially of about 60% to 90% by weight of 1,3-butadiene units of which at least about 60% by weight are linked by 1,2 addition and about 10% to 40% by weight of units of alpha-methyl styrene or styrene, the intrinsic viscosity of said copolymer being from 0.05 to 1 and (B) a drying agent consisting essentially of a cerium drier and a manganese drier in amounts sufficient to provide 50 to 3000 parts of cerium and 50 to 3000 parts of manganese per million parts of (A) copolymer, is fast curing and forms films which do not impart a characteristic off-taste to beverages when used as an interior topcoat for cans.

The compositions of this invention are used to form taste-free topcoats on a polymer basecoat having good adhesion to the metal substrate, good flexibility and good heat resistance. A preferred basecoat is the butadienoid coating described in Henderson, U.S. Patent 2,875,919. Epoxy-urea formaldehyde compositions and other oleoresinous compositions are also satisfactory basecoats.

The organic solvent of the composition consists essentially of at least one hydrocarbon solvent for the copolymer and the drier. The hydrocarbon solvent may be the same hydrocarbon used in the polymerization process described in this specification or other non-reactive hydrocarbon solvents characterized by a boiling range up to 220° C. and by freedom from residual components which would contribute to final film taste. An initial boiling point of at least 80° C. is best from a safety standpoint. Typical useful hydrocarbon solvents are aliphatic hydrocarbons, petroleum naphthas, mineral spirits, toluol, xylol or mixtures of these. VM & P naphtha, mineral spirits and high solvency petroleum naphthas of the toluol and xylol substitute classes are preferred because of good solvency, low cost and relative ease of handling. The hydrocarbon solvent can be supplemented with minor proportions of volatile non-hydrocarbon components including esters, ketones, alcohols, glycol ethers and glycol esters.

A minimum of about 60% by weight of the 1,3-butadiene units in the copolymer must be linked by 1,2 addition to form the taste-free coatings of this invention. Copolymers having 71% to 76% by weight of the 1,3-butadiene units linked by 1,2 addition are readily produced and form excellent coatings and are therefore preferred. The proportion of 1,2 addition is determined by infrared analysis of the copolymers using standard techniques.

This copolymer is preferably prepared by anionic copolymerization of 1,3-butadiene and alpha-methyl-styrene and/or styrene in a mixture of tetrahydrofuran and VM & P naphtha. Butyl lithium is the anionic polymerization catalyst. About 100 parts by weight of monomers, consisting of 60 to 90 parts of 1,3-butadiene mixed with 10 to 40 parts by weight of alpha-methyl-styrene, are added to 50 to 900 parts by weight of tetrahydrofuran. Up to 400 parts by weight of VM & P naphtha is added as additional solvent, along with 0.4 to 2 parts of butyl lithium catalyst.

The solution is polymerized at a temperature of 50° C. to 100° C. until the resulting copolymer reaches an intrinsic viscosity of 0.05 to 1.0, preferably from 0.15 to 0.6. Acetic acid is then added to terminate the reaction by forming lithium acetate, which is subsequently removed by filtration. The tetrahydrofuran is removed by distillation and purified for reuse. Naphtha or any of the other above-mentioned solvents can then be added to dilute the copolymer solution to the desired concentration.

The desired concentration of the copolymer in the coating composition of this invention depends on the contemplated application method. Solutions of less than 25% by weight of copolymer are generally most adaptable for air spraying methods. Solutions of from 25% to 40% by weight of copolymer are usually used with heated airless spray equipment. Copolymer concentrations from about 40 to about 63% by weight may be brushed or rolled onto the substrate. Copolymer concentrations above about 63% by weight are difficult to apply by present commercial methods. The most practical compositions for air spraying contain 25% by weight of copolymer and those for heated airless spraying preferably contain 40% by weight of copolymer. The 25% and 40% solutions are usable in conventional spraying equipment.

The intrinsic viscosity of the copolymers of this invention ranges from 0.05 to 1 based on relative viscosities measured in a 0.5% benzene solution at 25° C. The best films result from copolymers having an intrinsic viscosity between 0.15 and 0.6 as measured in this manner.

Other compatible polymers and copolymers can be included in the compositions of this invention in proportions up to 30% by weight of the total film-forming components. These supplemental film-forming polymers and copolymers may be polybutadiene as described in U.S. Patent 2,708,639; copolymers of butadiene as described in U.S. Patent 2,762,851; etc. Resinous hydrocarbons can also be used.

The cerium and manganese driers may be made by reacting the metals with a fatty acid to form a metal carboxylate salt. Salts which are approved by the Food and Drug Administration as usable driers for coating in contact with foods and beverages may be used in the compositions of this invention. The Food and Drug Administration's listing of Apr. 20, 1963 includes caprate, coprylate, linoleate, naphthenate, 2-ethylhexoate (octoate), oleate, palmitate, resinate, ricinoleate, soyate, stearate and tallate salts. Cerium naphthenate and manganese octoate are preferred because they are readily soluble. The commercial grades of these preferred drier compounds are usable even though these grades contain trace amounts of metals closely associated with cerium and manganese in the Periodic Table. These commercial grades are generally mixtures of the higher and lower metallic valence forms of these metals. The driers can initially be composed wholly of either valence form.

From 400 to 800 parts of cerium and 400 to 800 parts of manganese per million parts of copolymer are preferred in the compositions of this invention. These preferred quantities produce solutions having curing schedules adaptable to a wide variety of conditions. Larger or smaller quantities within the previously established limits may be used for special curing conditions.

The preferred proportions of monomers in the copolymers of this invention are 70% to 85% by weight of 1,3-butadiene units and 15% to 30% by weight of alpha-methyl styrene or styrene units. The copolymers within this range have the best combination of flexibility and coating properties.

Small amounts of stabilizer may be used to increase the storage life of the compositions of this invention. Any of the fatty acids used to form the driers of this invention as disclosed above can be used as the stabilizer. The preferred stabilizer is 2-ethylhexoic acid. The quantity of stabilizer can range as high as 25% to 30% by weight based on copolymer weight although up to 4% on this basis is usually sufficient. The stabilizer is added to the composition by a simple mixing operation.

The compositions of this invention are applied to the basecoated substrate in sufficient quantity to provide a dry coating weight of 2 to 15 milligrams per square inch of coated surface. Dry topcoat weights of about 5 milligrams per square inch are preferred because they have the best combination of flexibility and covering power. Basecoat dry coating weights are preferably from 2 to 6 milligrams per square inch. The substrate may be of steel, tin coated steel, aluminum or any other metals normally used to form beverage containers.

The applied solution is then baked to form the film. The recommended baking schedule for a topcoat having a dry weight of 5±0.5 milligrams per square inch is six minutes at 320° F. The minimum baking cycle for this top coating weight is six minutes at 280° F, the recommended baking schedule for a topcoat having a dry weight of 6.5±0.5 milligrams per square inch is six minutes at 340° F., with a minimum schedule of six minutes at 300° F.

The preferred maximum curing schedule to form taste-free coatings is ten minutes at 425° F. Higher curing temperatures for shorter periods of time may be used.

Additives such as silicone fluids and soluble diorganosiloxane polymers can be added to the solutions of this invention in quantities as high as 500 parts by weight per million parts of coplymer to enhance application and final film properties. Soluble organo-titanium compounds which improve fracture resistance of the film can also be added in proportions up to 5% by weight of copolymer weight. However, these additives are not essential to the use of the solutions of this invention. Pigments such as titanium dioxide, zinc oxide, iron oxide, carbon black and non-leafing aluminum can also be added in quantities as high as 50 parts by weight per 100 parts of copolymer. Normally, unpigmented can coatings are most desirable since overspray of the unpigmented solution onto the external lithography of the can is not noticeable.

Taste evaluation tests have shown that coatings produced by the compositions of this invention do not impart off-taste to the liquids in contact therewith.

The following examples illustrate the preparation and use of the compositions of this invention. All parts and percentages are on a weight basis.

*Example I*

Five separate portions are made up with the following components and quantities to make 100 gallons of final solution.

| | Pounds |
|---|---|
| Portion 1: | |
| Alpha-methyl-styrene | 63.74 |
| Tetrahydrofuran | 207.40 |
| VM & P naphtha | 452.86 |
| Portion 2: Solution of n-butyl lithium in 15% heptane | 19.03 |
| Portion 3: 1,3-butadiene | 213.11 |
| Portion 4: | |
| VM & P naphtha | 452.86 |
| Acetic acid—99.8% min. | 3.42 |
| Portion 5: Calcium hydrate | 2.1 |

The alpha-methyl styrene monomer is at least 99.2% pure. The tetrahydrofuran has a boiling point of 66° C. and is stabilized with caustic pellets against peroxide formation. The VM and P naphtha is a petroleum fraction which has an initial boiling point of 100° C. minimum, 50% at 120° C. to 130° C., and an end point of 163° C. maximum, when tested according to ASTM test procedure D-86-56. The aniline point of the VM & P naphtha is from 54° C. to 58° C. The 1,3-butadiene is ordinary rubber grade having a conjugated diene content of at least 98% when tested according to ASTM test procedure D-973-50.

A polymerization reaction vessel is purged of moisture and air by sweeping the vessel with nitrogen. The polymerization reaction is conducted in an atmosphere of nitrogen.

Portion 1 is passed through an adsorption column of anhydrous calcium sulfate and through a Linde 4A molecular sieve to remove moisture. The portion is then charged directly to the polymerization reactor where it is thoroughly mixed by agitation.

Portion 2 is stirred into portion 1, which causes a temperature rise. Portion 3 is distilled into a weighing tank, passed through a drying column of anhydrous calcium sulfate and added to the reactor continuously over a period of 40 to 60 minutes. The temperature rises rapidly to the solvent reflux temperature of about 70° C. to 78° C. and is held within this range during the addition of portion 3 and for about one hour afterward.

Portion 4 is charged into a stripping kettle. The solution from the reactor is pumped into the stripping kettle and mixed therewith for 15 minutes. The resulting mixture is vacuum distilled at a temperature below about 60° C. to remove tetrahydrofuran. About 280 pounds of distillate which also contains VM & P naphtha and unreacted monomers is removed.

Portion 5 is added and thoroughly mixed with the copolymer solution to remove acidic impurities. The copolymer solution is then filtered using a filter aid and activated alumina to remove the precipitated lithium acetate, acetic acid, lime and other foreign matter.

The resulting solution consists essentially of about 40% copolymer in VM & P naphtha. The copolymer consists essentially of 23% to 25% alpha-methyl-styrene units and 75 to 77% 1,3-butadiene units. From 71% to 76% of the 1,3-butadiene is linked by 1,2 addition. The relative viscosity of the copolymer is from 1.1 to 1.3 as measured in a 0.5% benzene solution, the intrinsic viscosity being from 0.2 to 0.5.

1.81 pounds of a 57% solution of cerium naphthenate in mineral spirits (6% cerium) and 1.81 pounds of a 57% solution of manganese octoate in mineral spirits (6% manganese) are then stirred into the solution. The resulting 100 gallons of solution is suitable for application to substrates by heated airless spray techniques and when so applied provides a taste-free coating. When the composition will not be used within a short period of time, 5.42 pounds of a stabilizer such as 2-ethylhexoic acid can be added to greatly increase its stability.

The coating composition of this example was applied to a basecoated tin plated steel substrate of the type utilized in the fabrication of sanitary containers which had been rolled into a cylinder and which had one end closure seamed thereon. The coating was cured for 6 minutes at 320° F. Dry film thickness of the topcoat was 5±0.5 milligrams per square inch.

These containers were filled with beer and sealed with a similarly coated second end closure. Periodic taste analysis of the beer disclosed that essentially no off-taste was imparted to the beverage by the coating.

Standard taste tests conducted with "Purock" water in contact with the cured compositions of this example on a basecoated aluminum substrate also resulted in taste ratings of zero to one on the normal scale of zero to ten, which is essentially no change in taste.

*Example II*

Following the procedure of Example I, but prior to adding the manganese octoate and the cerium naphthenate, 426.5 pounds of the copolymer solution is placed in a mixing vessel. 84.40 pounds of VM & P naphtha, 166.45 pounds of xylene, 1.13 pounds of a 57% solution of manganese octoate in mineral spirits (6% manganese) and 1.13 pounds of a 57% solution of cerium naphthenate in mineral spirits (6% cerium) are mixed into the solution. 100 gallons of a 25% copolymer solution suitable for air spraying is produced. The shelflife of this composition is greatly increased by adding about 3.39 pounds of 2-ethylhexoic acid as stabilizer. Coatings were applied to various substrates as in Example I. Taste evaluation tests again showed that the coatings imparted essentially no taste to beverages in contact therewith.

*Example III*

Five portions are prepared as in Example I except that alpha-methyl-styrene is not included in portion 1. A separate portion, designated portion 6, of 63.70 pounds of styrene monomer is prepared.

The reaction vessel is purged with nitrogen and portion 1 is purified and charged to the vessel by the procedure of Example I. The solution in the vessel is agitated while portion 2 is added and the mixture is heated to 60° C. to 65° C.

Portion 3 (1,3-butadiene) and portion 6 (styrene) are simultaneously and continuously added to the reaction vessel over a period of 40 to 60 minutes. Portion 3 is added by distilling it into a weighing tank and passing it through a drying column as in Example I. Portion 6 (styrene) is passed through a drying column of anhydrous calcium sulfate and a Linde 4A molecular sieve and then added to the reaction vessel. The temperature rises rapidly to a reflux temperature of 70° C. to 78° C. and is held within this range during the addition of the monomers and for about one hour afterward. The remainder of the process is carried out as in Example I.

The resulting solution has properties similar to the solutions of Example I even though styrene is substituted for alpha-methyl-styrene in the copolymer.

Manganese octoate and cerium naphthenate are mixed into the resulting solution as in Example I. Additional VM & P naphtha and xylene may be added to reduce the copolymer proportion to 25% by the procedure of Example II. Applications of these solutions to metal substrates, such as the interior of beer cans, provides essentially taste-free coatings after curing.

The term "taste-free" as used herein refers to coatings and films which do not impart an "off-taste" to beverages, such as beer, in contact therewith.

What is claimed is:

1. A fast drying coating composition capable of forming taste-free films comprising a hydrocarbon solvent with a boiling range of up to about 220° C. having dissolved therein (A) up to about 63% of a copolymer consisting essentially of about 60% to about 90% by weight of 1,3-butadiene units and about 10% to about 40% by weight of monomer units selected from the group consisting of alpha-methyl-styrene and styrene, at least about 60% by weight of the 1,3-butadiene units being linked by 1,2 addition, the intrinsic viscosity of said copolymer being from about 0.05 to about 1.0 and (B) a drying agent consisting essentially of a cerium salt and a manganese salt selected from the group of caprate, caprylate, linoleate, naphthenate, 2-ethylhexoate, oleate, palmitate, resinate, ricinoleate, soyate, stearate, and tallate, in sufficient amounts to provide about 50 to about 3000 parts of cerium and about 50 to about 3000 parts of manganese per million parts of (A) copolymer.

2. The composition of claim 1 in which the (A) copolymer consists essentially of 1,3-butadiene units and alpha-methyl-styrene units.

3. The composition of claim 2 in which the (A) copolymer consists essentially of 70% to 85% by weight of 1,3-butadiene units and 15% to 30% by weight of alpha-methyl-styrene units.

4. The composition of claim 3 in which from 71% to 76% by weight of the 1,3-butadiene units are linked by 1,2 addition.

5. The composition of claim 4 in which the drying agent consists essentially of cerium naphthenate and manganese octoate.

6. The composition of claim 5 in which the cerium naphthenate and the manganese octoate are in sufficient quantities to provide 400 to 800 parts of cerium and 400 to 800 parts of manganese per million parts of (A) copolymer.

7. The composition of claim 6 in which the organic solvent is a petroleum fraction having a boiling range from 100° C. to 163° C.

8. The composition of claim 7 in which the organic solvent is a mixture of a petroleum fraction having a boiling range from 100° C. to 163° C. and xylene.

9. The composition of claim 7 in which the intrinsic viscosity of the copolymer is 0.15 to 0.6.

10. The composition of claim 7 which also contains a fatty acid stabilizer in an amount of up to about 30% based on the copolymer.

11. The composition of claim 10 in which the stabilizer is 2-ethylhexoic acid.

12. The composition of claim 1 in which the drying agent consists essentially of cerium naphthenate and manganese octoate.

13. The composition of claim 1 which also contains a fatty acid stabilizer in an amount of up to about 30% based on the copolymer.

14. The composition of claim 13 in which the stabilizer is 2-ethylhexoic acid.

15. The composition of claim 1 which also contains a pigment.

16. The composition of claim 1 in which the intrinsic viscosity of the copolymer is 0.15 to 0.6.

References Cited

UNITED STATES PATENTS

| 2,669,526 | 2/1954 | Koenecke et al. | |
| 2,875,919 | 3/1959 | Henderson. | |
| 2,922,768 | 1/1960 | Mino et al. | |
| 2,922,775 | 1/1960 | Mino et al. | |
| 3,023,117 | 2/1962 | Grummitt et al. | 106—310 |
| 3,105,828 | 10/1963 | Porter. | |
| 3,136,448 | 6/1964 | McDowell | 220—64 |

ALLAN LIEBERMAN, *Primary Examiner.*

JULIUS FROME, *Examiner.*